United States Patent
Wöhlte

(10) Patent No.: US 11,808,876 B2
(45) Date of Patent: Nov. 7, 2023

(54) VEHICULAR RADAR SYSTEM WITH VEHICLE TO INFRASTRUCTURE COMMUNICATION

(71) Applicant: Magna Electronics Inc., Auburn Hills, MI (US)

(72) Inventor: Wilhelm Johann Wolfgang Wöhlte, Sailauf (DE)

(73) Assignee: Magna Electronics Inc., Auburn Hills, MI (US)

( * ) Notice: Subject to any disclaimer, the term of this patent is extended or adjusted under 35 U.S.C. 154(b) by 273 days.

(21) Appl. No.: 16/662,197

(22) Filed: Oct. 24, 2019

(65) Prior Publication Data

US 2020/0132802 A1  Apr. 30, 2020

Related U.S. Application Data

(60) Provisional application No. 62/750,353, filed on Oct. 25, 2018.

(51) Int. Cl.
*G01S 13/93* (2020.01)
*G01S 7/00* (2006.01)
*G01S 13/931* (2020.01)

(52) U.S. Cl.
CPC .......... *G01S 7/006* (2013.01); *G01S 13/931* (2013.01); *G01S 2013/93271* (2020.01)

(58) Field of Classification Search
CPC .................. G01S 7/006; G01S 13/931; G01S 2013/93271
See application file for complete search history.

(56) References Cited

U.S. PATENT DOCUMENTS

| | | | |
|---|---|---|---|
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |

(Continued)

FOREIGN PATENT DOCUMENTS

| | | | |
|---|---|---|---|
| JP | 2007060289 A | * | 3/2007 |
| WO | 2011090484 A1 | | 7/2011 |

*Primary Examiner* — Timothy A Brainard
(74) *Attorney, Agent, or Firm* — HONIGMAN LLP

(57) ABSTRACT

A vehicular radar sensing system includes a radar sensor disposed at a vehicle so as to sense exterior of the vehicle, and a control. The radar sensor includes a plurality of transmitters that transmit radio signals, and a plurality of receivers that receive radio signals. The transmitters transmit first radio signals at a first frequency and second radio signals at a second frequency, with the second frequency different from the first frequency. First radio signals received are transmitted first radio signals from the plurality of transmitters that are reflected from an object exterior the vehicle. The control, via processing of the received first radio signals, determines presence of an object exterior of the vehicle. The transmitters transmit second radio signals at the second frequency for receiving at a remote communication device. Second radio signals received at the transmitter are second radio signals transmitted by the remote communication device.

19 Claims, 6 Drawing Sheets

(56) References Cited

U.S. PATENT DOCUMENTS

| | | |
|---|---|---|
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 9,813,222 B2 * | 11/2017 | Shimizu ............... H04W 40/005 |
| 2005/0137786 A1 * | 6/2005 | Breed ................. G05D 1/0246 701/482 |
| 2008/0150786 A1 * | 6/2008 | Breed ................. B60W 30/16 342/53 |
| 2009/0237291 A1 * | 9/2009 | Sakuma ............... G01S 5/0072 342/107 |
| 2010/0245066 A1 | 9/2010 | Sarioglu et al. |
| 2012/0062743 A1 | 3/2012 | Lynam et al. |
| 2012/0218412 A1 | 8/2012 | Dellantoni et al. |
| 2013/0222592 A1 | 8/2013 | Gieseke |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0137786 A1 * | 5/2015 | Maddali ............... H02M 1/32 323/284 |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |
| 2017/0201887 A1 * | 7/2017 | Farshchian ........... H04W 16/14 |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2019/0235050 A1 * | 8/2019 | Maligeorgos ........... G01S 7/032 |
| 2019/0339382 A1 | 11/2019 | Hess et al. |

* cited by examiner

VEHICULAR RADAR SYSTEM WITH VEHICLE TO INFRASTRUCTURE COMMUNICATION

CROSS REFERENCE TO RELATED APPLICATION

The present application claims the filing benefits of U.S. provisional application Ser. No. 62/750,353, filed Oct. 25, 2018, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of imaging and radar sensors in vehicle sensing systems is common and known. Examples of such known systems are described in U.S. Pat. No. 8,013,780, which is hereby incorporated herein by reference in its entirety.

SUMMARY OF THE INVENTION

The present invention provides a driving assistance system or sensing system or vehicle control system for a vehicle that utilizes one or more radar sensors to sense regions exterior of the vehicle, with the radar sensor including a plurality if transmitters and a plurality of receivers, where each transmitter can transmit at a first frequency and a second frequency and each receiver can receive at the first frequency and the second frequency. The receivers receive radio signals at the first frequency that are reflected off objects to determine presence of an object exterior of the vehicle. The receivers receive radio signals at the second frequency that are transmitted from transmitters remote from the vehicle that establish communication with the remote transmitters.

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
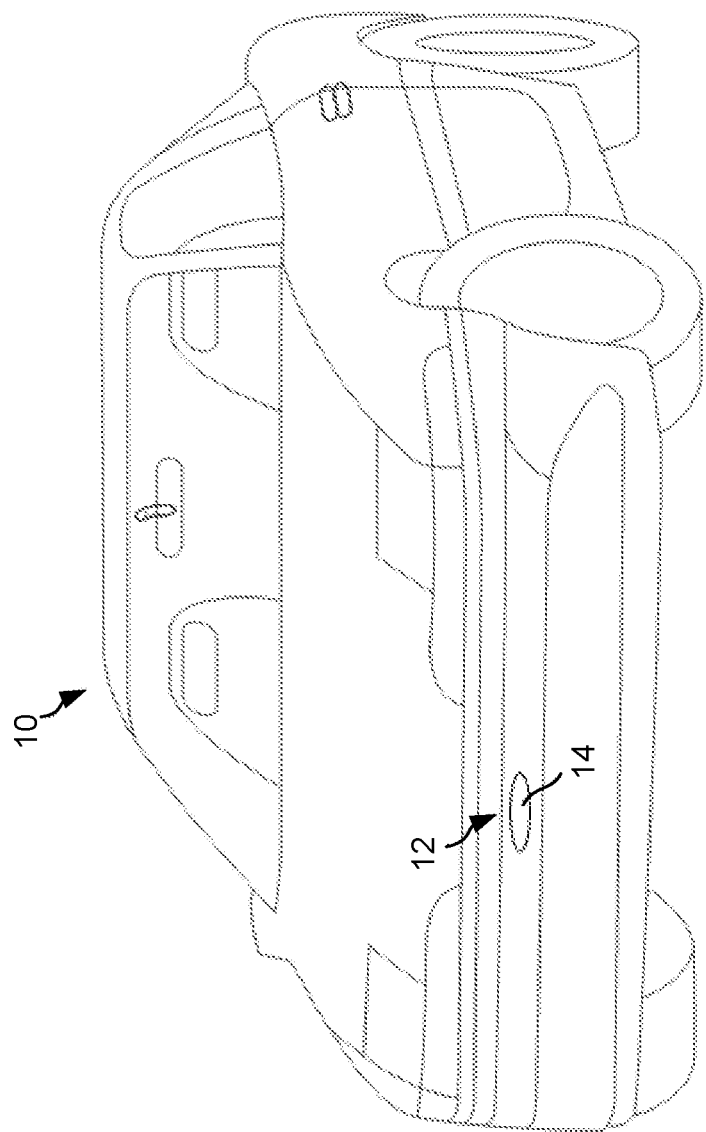
FIG. 1 is a perspective view of a vehicle with a sensing system that incorporates a radar sensor in accordance with the present invention.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

The radar sensor or sensors of the driving assist system may be used in conjunction with a plurality of image sensors mounted at the equipped vehicle and/or with at least one lidar sensor also mounted (along with the image sensors and the radar sensor) at the equipped vehicle. Image data and radar data and lidar data are provided to a central electronic control unit (ECU) or module for processing thereat. The ECU includes at least one processor that processes the captured/sensed data, whereby one or more functions or systems (such as a braking system and/or steering system and/or the like) of the vehicle is controlled responsive to processing of the captured/sensed data.

Figure 2:
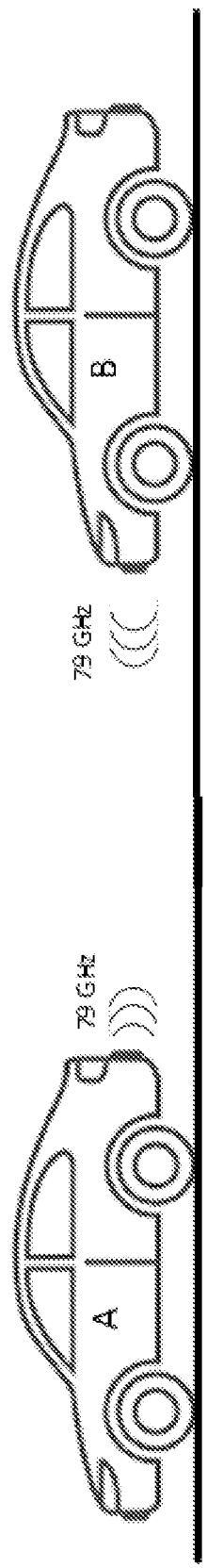
FIG. 2 is a schematic view of prior art with typical RADAR operation.
Figure 3:
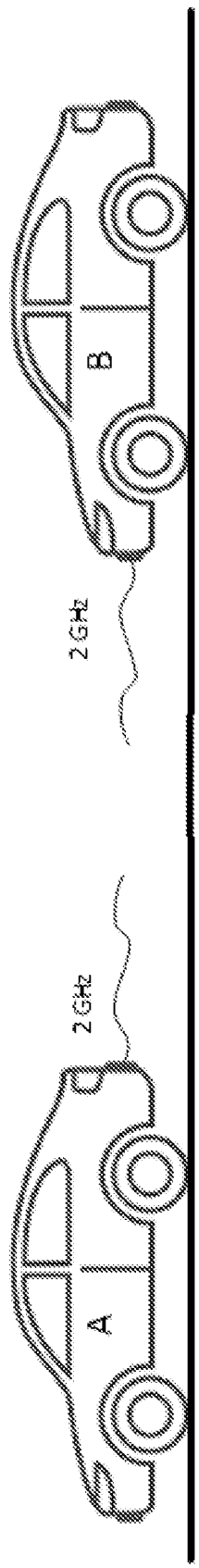
FIG. 3 is a schematic view of prior art with typical V2X communication.

The system includes a plurality of transmitter antennas and a plurality of receiver antennas, which may be disposed on a printed circuit board (PCB) that includes associated circuitry. Optionally, a three dimensional (3D) antenna, such as a wave guide or the like, may be used. As shown in FIG. 2, driving assist systems that include radar typically operate at a single high frequency (e.g., 79 GHz). For example, the vehicle may operate an adaptive cruise control (ACC) or automatic emergency braking (AEB) system using such a radar system. As shown in FIG. 3, vehicle-to-vehicle (V2V) communication or vehicle-to-infrastructure (V2X) communication typically occurs at a much lower frequency than the previously discussed driving assist systems (e.g., 2 GHz).

Figure 4:
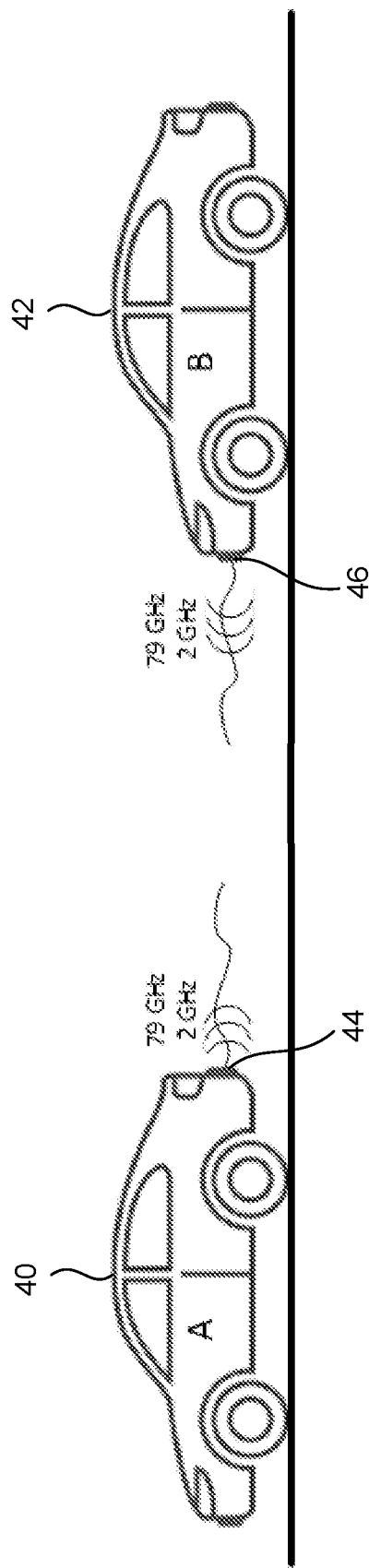
FIG. 4 is a schematic view of a communication system in accordance with the present invention.

Referring now to FIG. 4, the radar system may offer multiple receive and transmit channels that support multiple frequency and ranges and include multiple-input and multiple-output (MIMO) capabilities. The system may provide a plurality of channels, with each channel dedicated to a different frequency and/or application. For example, an 8 channel array may have channels 1-7 dedicated to driving assist systems, such as ACC and AEB at a high frequency (e.g., 76 to 81 GHz or 79 GHz), and channel 8 dedicated to V2V or V2X communication at a lower frequency (e.g., 1 to 3 GHz or 2 GHz). The chosen frequencies may be in frequency ranges that are or will be defined by regulations or other sources, such as ANSI (American National Standards Institute), ETSI (European Telecommunications Standards Institute), Bundesnetzagentur Federal Network Agency or others. The antenna design may be different for antennas supporting different frequencies (e.g., a 79 GHz antenna design may be different than a 2 GHz antenna design). Thus, the radar system 12 may combine the operation of one or more driving assist systems and V2V/V2X communication. The processing may be accomplished with a dedicated processor or with processing integrated with the radar sensors into a system on a chip (SoC) design.

For example, and as illustrated in FIG. 4, a first vehicle 40 leads a second vehicle 42. The first vehicle 40 may have a rear-facing radar 44 (e.g., at a rear portion of the vehicle) while the second vehicle 42 may have a forward-facing radar 46 (e.g., at a front portion of the vehicle). The radars 44, 46 may perform functions, such as ACC or AEB, at a first frequency. For example, waves transmitted by the radar system 46 of the second vehicle 42 (at the first frequency) are reflected off the first vehicle 40, and the reflections are detected by the receiving antennas of the radar system 46 of the second vehicle 42 (still at the first frequency). Simultaneously, a separate communication link between the two radar systems 44, 46 may be established at a second frequency. For example, the second frequency may be lower than the first frequency (e.g., 2 GHz). This frequency difference allows the systems to operate simultaneously without interference from each other.

This communication link is not dependent upon reflections, but instead relies on the transmitters from one vehicle transmitting signals directly to the receivers of the other vehicle. This communication link allows the vehicles to share information. For example, the vehicles may share global positioning system (GPS) data (i.e., position or location of each vehicle). In some examples, the GPS module and the radar system are connected to each other via the vehicle bus (e.g., via CAN). Other information may be shared between the vehicle as well (e.g., speed, heading, capabilities, passenger information, etc.). The communication link may be established between more than two vehicles. Communication may also be established to infrastructure (e.g., traffic lights). For example, a traffic light could communicate the status of the traffic light to the vehicle. The system 12 may operate at more than two frequencies. For example, a third dedicated frequency may operate to establish communication with infrastructure while the second frequency establishes communication with other vehicles.

Figure 5:
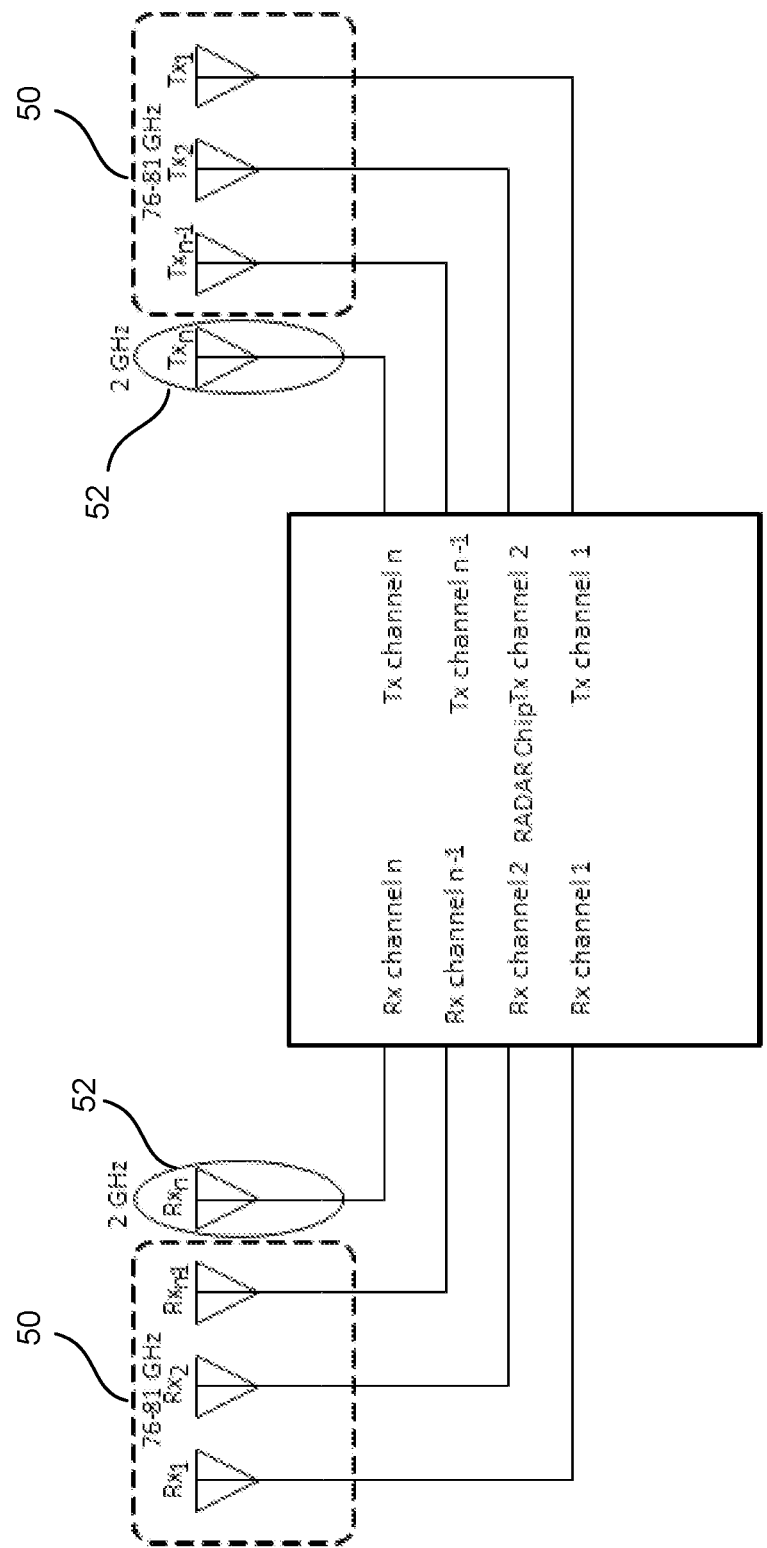
FIG. 5 is a schematic view of a circuit for the communication system of FIG. 4.
Figure 6:
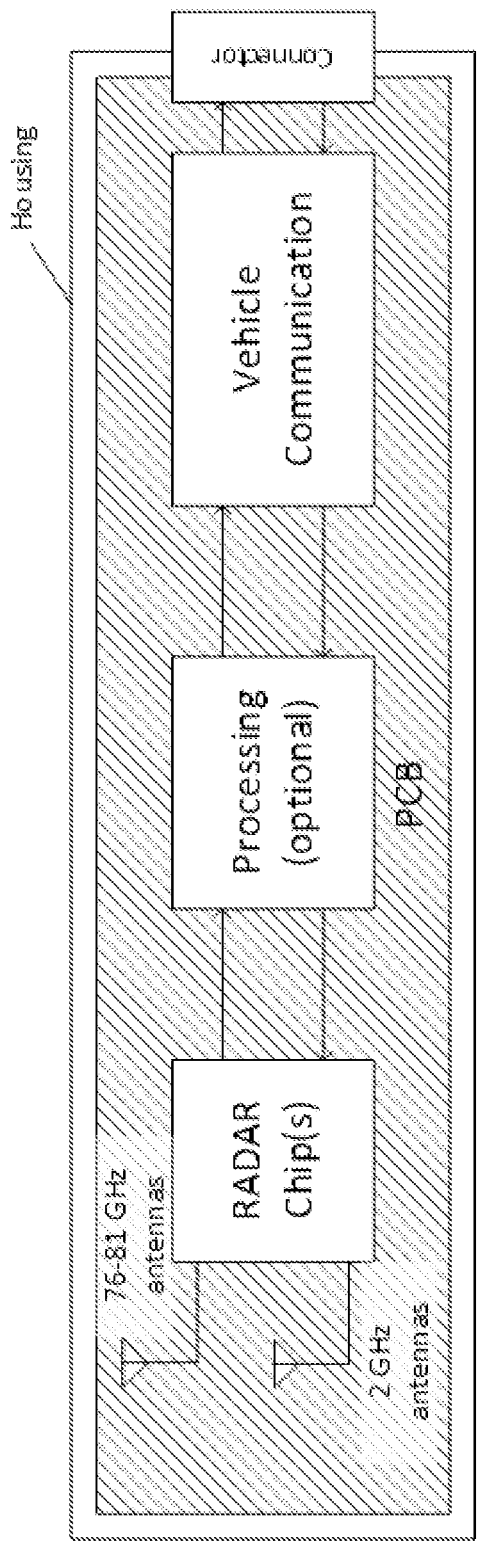
FIG. 6 is a block diagram of the communication system of FIG. 4.

Referring now to FIG. 5, a radar chip of the radar system 12 may include multiple transmit and receive channels on the same chip. A portion of these channels and/or antennas 50 may be dedicated to driving assist systems (such as ACC and AEB) while a different portion of channels and/or antennas 52 may be dedicated to V2V or V2X communication. FIG. 6 illustrates a block diagram of radar system 12. The processing may be embedded or integrated into the radar system 12 or be separate from the system (e.g., the vehicle ECU).

Thus, the present invention provides a means for vehicles equipped with radar sensors to simultaneously communicate with other vehicles or with infrastructure. Today, many new vehicles have GPS and radar sensors equipped as these tools are key for driving assistance systems and autonomous driving. These existing systems may be modified to provide helpful communication (such as position location) at a different frequency so that the driving assistance systems are not disturbed.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system communicates with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
   a radar sensor disposed at a vehicle so as to sense exterior of the vehicle;
   wherein the radar sensor comprises a radar chip, and wherein the radar chip comprises a plurality of channels, and wherein each channel of the plurality of channels comprises at least one transmitter that transmits radio signals and at least one receiver that receives radio signals;
   a control having a processor that processes outputs of each receiver of the plurality of channels;
   wherein a first channel of the plurality of channels transmits first radio signals at a first frequency and a second channel of the plurality of channels transmits second radio signals at a second frequency simultaneously, and wherein the second frequency is different from the first frequency;
   wherein first received radio signals received at the plurality of channels are transmitted first radio signals that are reflected off an object exterior the vehicle, and wherein the control, via processing by the processor of the first received radio signals, determines presence of the object exterior the vehicle;
   wherein the second channel of the plurality of channels transmits second radio signals at the second frequency for receiving at a remote communication device; and
   wherein second received radio signals received at the plurality of channels are radio signals transmitted at the second frequency by the remote communication device.

2. The vehicular radar sensing system of claim 1, wherein the first channel of the plurality of channels is dedicated to transmitting and receiving first radio signals and the second channel of the plurality of channels is dedicated to transmitting and receiving second radio signals.

3. The vehicular radar sensing system of claim 1, wherein the remote communication device is disposed at another vehicle, and wherein the second channel of the plurality of channels establishes communication with the remote communication device of the other vehicle.

4. The vehicular radar sensing system of claim 3, wherein the vehicular radar sensing system exchanges position data of the vehicle with the other vehicle.

5. The vehicular radar sensing system of claim 1, wherein a plurality of remote communication devices are disposed at respective ones of a plurality of other vehicles, and wherein the second channel of the plurality of channels establishes communication with the remote communication devices of the plurality of other vehicles simultaneously.

6. The vehicular radar sensing system of claim 1, wherein the remote communication device is disposed at a stationary object, and wherein the second channel of the plurality of channels establish communication with the remote communication device of the stationary object.

7. The vehicular radar sensing system of claim 1, wherein the plurality of channels receive first radio signals and second radio signals simultaneously.

8. The vehicular radar sensing system of claim 1, wherein the processor is embedded within the radar sensor.

9. The vehicular radar sensing system of claim 1, wherein the first frequency is greater than the second frequency.

10. The vehicular radar sensing system of claim 9, wherein a third channel of the plurality of channels transmits third radio signals at a third frequency, and wherein the third channel of the plurality of channels transmits third radio signals at the third frequency for receiving at a second remote communication device, and wherein the remote communication device is another vehicle, and wherein the second remote communication device is a stationary object.

11. A vehicular radar sensing system, the vehicular radar sensing system comprising:
  a radar sensor disposed at a vehicle so as to sense exterior of the vehicle;
  wherein the radar sensor comprises a radar chip, and wherein the radar chip comprises a plurality of channels, and wherein each channel of the plurality of channels comprises at least one transmitter that transmits radio signals and at least one receiver that receives radio signals;
  a control having a processor that processes outputs of each receiver of the plurality of channels;
  wherein a first channel of the plurality of channels transmits first radio signals at a first frequency and a second channel of the plurality of channels transmits second radio signals at a second frequency simultaneously, and wherein the second frequency is different from the first frequency;
  wherein the first channel is dedicated to transmitting and receiving first radio signals and the second channel is dedicated to transmitting and receiving second radio signals;
  wherein first received radio signals received at the first channel are transmitted first radio signals that are reflected off an object exterior the vehicle, and wherein the control, via processing by the processor of the first received radio signals received at the first channel, determines presence of the object exterior the vehicle;
  wherein the second channel of the plurality of channels transmits second radio signals at the second frequency for receiving at a remote communication device;
  wherein second radio signals received at the second channel are radio signals transmitted at the second frequency by the remote communication device; and
  wherein the remote communication device is disposed at another vehicle, and wherein the second channel of the plurality of channels establishes communication with the remote communication device of the other vehicle.

12. The vehicular radar sensing system of claim 11, wherein the remote communication device is disposed at another vehicle, and wherein the second channel of the plurality of channels establishes communication with the other vehicle.

13. The vehicular radar sensing system of claim 12, wherein the vehicular radar sensing system exchanges position data of the vehicle with the other vehicle.

14. The vehicular radar sensing system of claim 11, wherein a plurality of remote communication devices are disposed at respective ones of a plurality of other vehicles, and wherein the second channel of the plurality of channels establishes communication with the remote communication devices of the plurality of other vehicles simultaneously.

15. The vehicular radar sensing system of claim 11, wherein the remote communication device is disposed at a stationary object, and wherein the second channel of the plurality of channels establishes communication with the remote communication device of the stationary object.

16. The vehicular radar sensing system of claim 11, wherein the first channel of the plurality of channels receives first radio signals and the second channel of the plurality of channels receives second radio signals simultaneously.

17. The vehicular radar sensing system of claim 11, wherein the processor is embedded within the radar sensor.

18. A vehicular radar sensing system, the vehicular radar sensing system comprising:
  a radar sensor disposed at a vehicle so as to sense exterior of the vehicle;
  wherein the radar sensor comprises a radar chip, and wherein the radar chip comprises a plurality of channels, and wherein each channel of the plurality of channels comprises at least one transmitter that transmits radio signals and at least one receiver that receives radio signals;
  a control having a processor that processes outputs of each receiver of the plurality of channels;
  wherein a first channel of the plurality of channels transmits first radio signals at a first frequency and a second channel of the plurality of channels transmits second radio signals at a second frequency, and wherein the second frequency is different from the first frequency;
  wherein the first channel of the plurality of channels transmits first radio signals at the first frequency and second radio signals at the second frequency simultaneously;
  wherein first received radio signals received at the plurality of channels are transmitted first radio signals that are reflected off an object exterior the vehicle, and wherein the control, via processing by the processor of the received first radio signals, determines presence of the object exterior the vehicle;
  wherein the second channel of the plurality of channels transmits second radio signals at the second frequency for receiving at a remote communication device;

wherein second radio signals received at the plurality of channels are radio signals transmitted at the second frequency by the remote communication device;

wherein the plurality of channels receive first radio signals and second radio signals simultaneously; and wherein the remote communication device is disposed at a stationary object, and wherein the second channel of the plurality of channels establishes communication with the stationary object.

19. The vehicular radar sensing system of claim 18, wherein a plurality of other remote communication devices are disposed at respective ones of a plurality of other vehicles, and wherein the second channel of the plurality of channels establishes communication with the other remote communication devices of the plurality of other vehicles.

* * * * *